July 3, 1962 D. D. WILLARD 3,042,823

HIGH SPEED ELECTRONIC MEMORY

Filed Nov. 28, 1958

INVENTOR.
DENNIS D. WILLARD

BY Edward A. Robinson
ATTORNEY

United States Patent Office 3,042,823
Patented July 3, 1962

3,042,823

HIGH SPEED ELECTRONIC MEMORY

Dennis D. Willard, Santa Clara County, Calif., assignor to International Business Machines Corporation, New York, N.Y., a corporation of New York Filed Nov. 28, 1958, Ser. No. 776,852
2 Claims. (Cl. 313—6)

This invention relates to electronic computers and more particularly to digital memory or data storage devices of the matrix type wherein each bit of information is recorded and stored at particular coordinates by the the energization of selected electrical conductors along an X and a Y axis.

An object of this invention is to provide a matrix of gaseous cells in a unitary sheet or body of non-conducting material, each of the cells of the matrix being provided with electrodes for selectively initiating electric discharge therein, for sustaining a discharge once initiated, and for sensing the presence of such a discharge without altering the cell state.

Another object is to provide a method and means for storing digital information by providing a matrix of multi-electrode electrical discharge elements arranged in columns and rows wherein a selected element may be rendered conductive by applying a voltage to X- and Y-axis conductors which intersect at the selected element within the matrix; similarly it is an object to reproduce the digital information from the matrix by testing an electrical characteristic of the conduction element to sense whether the element is in a conductive or a non-conductive state.

A further object is to provide a data storage matrix of gas cells, wherein digital information may be stored by an application of voltages to selected intersecting conductors crossing the matrix, and more specifically it is an object to provide such a matrix which is free from "back circuits" which could otherwise provide a conduction path to energize and render conductive cells other than the selected cell at the matrix intersection.

Briefly stated, according to a preferred embodiment of this invention, a matrix storage device comprises several thin layers of electrical insulating material such as plastic or glass having a matrix of holes or openings extending therethrough and with electrical conductors placed between the layers and spaced to intersect with the matrix holes. Each of the cavities or cells is intersected by a sufficient number of conductors at different levels therein to provide electrodes (1) for selectively initiating gaseous conduction within the cells, (2) for sustaining gaseous conduction, and (3) for sensing the presence of conduction by means such as the decreased resistance between a pair of electrodes caused by the ionization of the gas.

Other objects of the invention will be pointed out in the following description and claims and illustrated in the accompanying drawings which disclose, by way of example, the principle of the invention and the best mode which has been contemplated of applying that principle.

Figure 1:
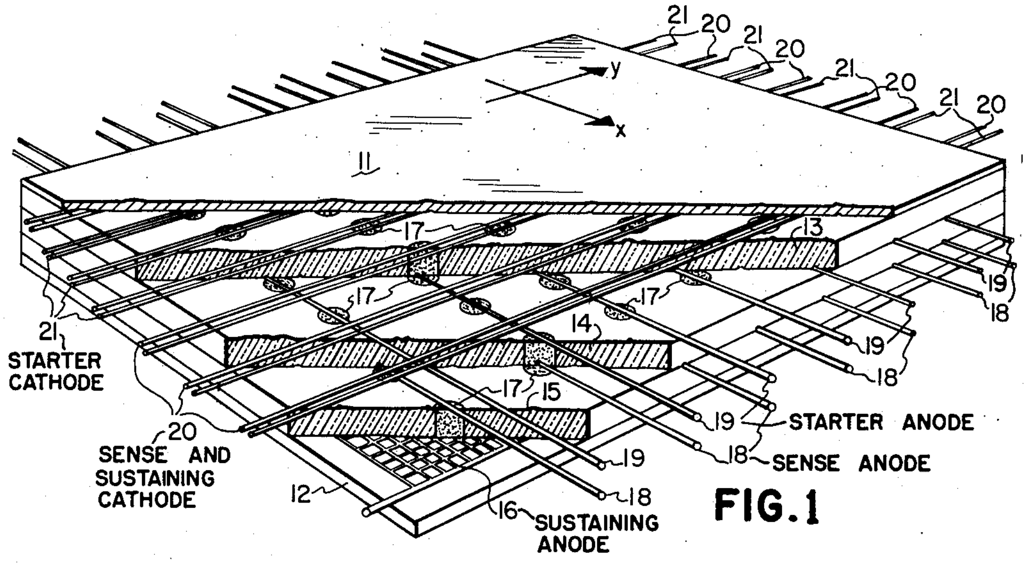
FIG. 1 is a perspective view with portions cut away to illustrate the structure of a matrix storage device in accordance with this invention.

While it may be readily appreciated that the memory matrix herein described will be operable in any position or orientation, it will be assumed for ease of description and understanding that the device is positioned horizontally and that the electrical conductors extend therethrough in horizontal planes between the various layers. Thus, as shown in FIG. 1, the device includes a top layer or cover of insulating material 11, a bottom cover 12, and three intermediate layers 13, 14 and 15. Each of the layers 13, 14 and 15 contains a rectangular matrix of holes extending therethrough. The holes may be formed by an etching process using the same mask or master plate such that each of the layers is substantially identical to the others. A process for etching layers of glass with a pattern of holes suitable for this matrix device is disclosed in an article, entitled "Chemical Machining of Photosensitive Glass," by Marshall Byer in the June 1956 issue of "Materials and Methods," published by the Reinhold Publishing Corporation. Sheets of thin accurately etched glass are available commercially and are known by the trade name of "Corning Fotoform Glass."

Figures 2, 3, 4:
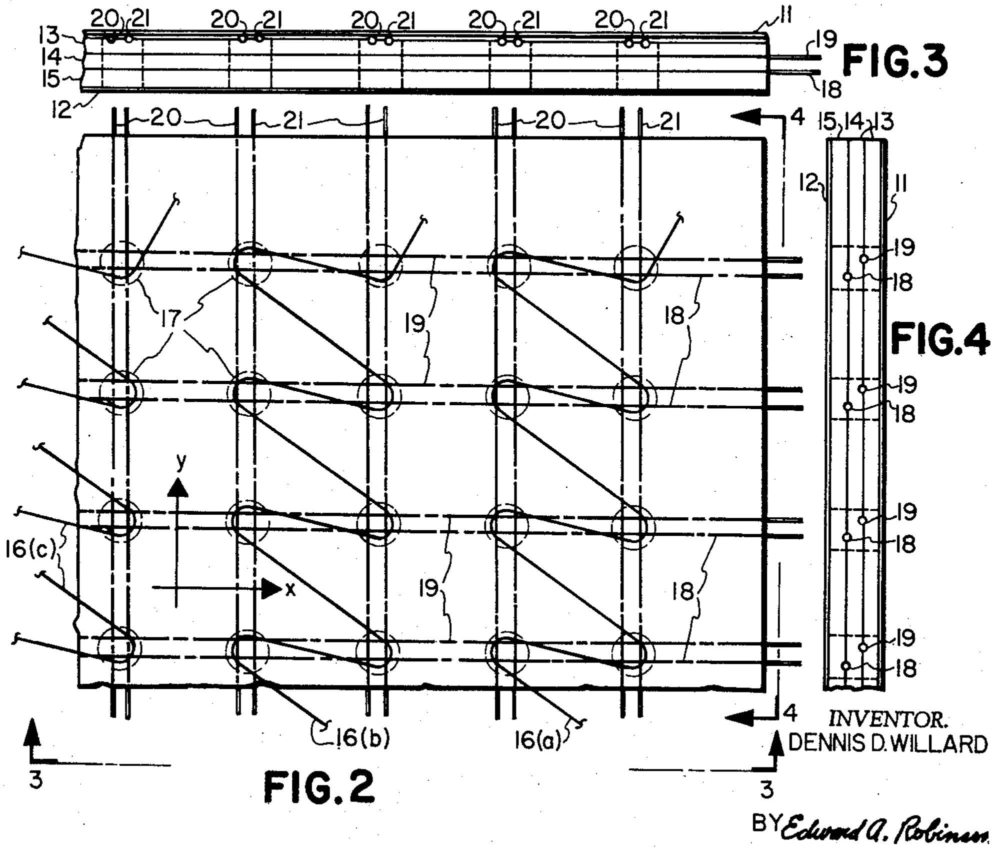
FIG. 2 is a horizontal or plan view of a matrix storage device similar to that shown in FIG. 1, but with a variation in the structure of the discharge sustaining electrode.
FIG. 3 is a vertical front view of the device looking along the line 3—3 of FIG. 2.
FIG. 4 is a vertical side view of this device looking along the line 4—4 of FIG. 2.

As shown in FIG. 1, the memory device is built up from a bottom cover plate 12 upon which is spaced a fine sheet or mesh of conduction material 16 which constitutes an electrode common to all of the gas cells and may be termed a "sustaining anode." The three intermediate layers of glass 13, 14 and 15 are positioned such that the holes etched therein are in alignment one with another, thereby forming a rectangular matrix of cavities 17 extending along X and Y axes as indicated by the arrows *x* and *y* in FIGS. 1 and 2. The two cover plates 11 and 12 are solid without holes, and thereby close off the cavities 17 at the top and bottom thereof. A series of parallel electrical conductors 18 extend in the X-direction between the glass sheets 14 and 15 and are arranged to intersect each of the cavities in their respective rows. Similarly, another series of conductors 19 extend in the X-direction through the matrix between the layers 13 and 14 and are arranged to intersect each of the cavities in their respective rows. The conductors 18 may be termed the "sense anodes," and the conductors 19 may be termed the "starter anodes." Between the layer 13 and the top cover 11 a series of pairs of parallel conductors 20 and 21 extend through the device in the Y-direction intersecting the cavities 17 by columns. The conductors 20 may be termed the "sense cathodes" while the conductors 21 may be termed the "starter cathodes."

As indicated heretofore, intermediate layers 13, 14 and 15 are preferably formed from thin sheets of glass having the holes 17 etched therein, while the cover plates 11 and 12 are solid without holes. The various layers and conductors are assembled, and the device is evacuated and then placed in an atmosphere of inert gas such as krypton or xenon at reduced pressure. The device is then heated to a temperature such that the conductors will partially fuse into the glass, and the glass sheets will bond together.

To operate the matrix memory device of this invention, a continuous voltage is applied between the sustaining anodes 16 and the sense cathodes 20. This voltage constitutes a conduction sustaining voltage, and is of a value sufficient to maintain an electrical conduction in any of the gas-filled cavities or matrix cells 17, but is insufficient to initiate such conduction therein. Information may be recorded into the matrix by applying a further voltage to selected starter cathodes 21 and selected starter anodes 19. As each bit of informational data is recorded, or "read into" the matrix, that gas-filled cavity positioned at the intersection between the selected starter cathode 21 and the selected starter anode 19 will be either biased into conduction indicative of a binary digit such as "1," or that cavity will remain non-conductive to indicate the other binary digit of "0." The selected cell 17 may be biased into conduction by a coincidence of a positive voltage pulse applied to the intersecting starter anode 19 and of a negative pulse applied to the intersecting starter cathode 21. Once rendered conductive, the cell or cavity will remain conductive due to the constant sustaining bias provided between the sense cathodes 20 and the sustaining anode 16.

The method of recording digital data upon the device of this invention is analogous to the recording of such data into a matrix of magnetic cores. Thus, to record information into a magnetic core matrix, appropriate X and Y conductors are pulsed with a current which, acting separately, would be insufficient to "flip" or reverse the polarity of a core, but when combined at the single core at the intersection of both of the X and Y conductors, the combined current is sufficient to flip that core. Similarly, in the instant device positive and negative voltage pulses may be impressed upon the appropriate X and Y conductors, and although each voltage acting separately will be insufficient to drive any of the various cells 17 into conduction, the cell at the intersection of both the selected X and the selected Y conductors will receive a combined voltage that is sufficient to "fire" the gas cell and render it electrically conductive. Alternatively, a voltage of sufficient strength to fire a gas cell may be applied across a selected starter cathode 21 and a selected starter anode 19 such that a circuit is completed only in the intersecting cavity 17 wherein conduction is desired. After data has been recorded or read into the matrix, certain of the gas cells 17 representative of digital "ones" of the stored data will remain in an electrical conductive state while the remainder of the cavities will be non-conductive.

To reproduce or "read out" the stored information, the effective resistance between each possible pair of sense cathodes 20 and sense anodes 18 is tested. If a gas cell 17 is non-conducting, then the resistance between the intersecting sense cathodes 20 and sense anodes 18 will remain comparatively high. However, if a particular gas cell 17 is in a state of conduction, ions within that cell will materially reduce the apparent resistance between the sense cathode 20 and the sense anode 18 which intersects at that point. It is proposed to sequentially connect a high impedance voltage source across the sense anodes and sense cathodes. The resulting voltage drop between these two electrodes will be high if the cell is non-conducting and low if the cell is conducting. Therefore, the voltage level of the high impedance voltage source will in itself be indicative of the bit information stored in each gas cell 17 which is tested.

The data reproduction, or readout, is non-destructive, i.e., the memory device will not be erased by the readout process. Thus, it is possible to read out this information more than once from this matrix device. To erase the information stored in the device and to prepare the device for a subsequent recording step, it is necessary to remove the sustaining voltage. This is most easily accomplished by disconnecting the sustaining anode 16 from its supply voltage for a short interval. In practical operation, it may be desirable to erase one section or portion of the matrix while retaining data information in other portions thereof. To accomplish this function, the sustaining anode 16 may be sectionalized as shown in FIG. 2. Thus, FIG. 2 shows several sustaining anodes 16(*a*), 16(*b*) and 16(*c*), each as a single wire or conductor zig-zagging back and forth across a section of the matrix and intersecting each of the cavities in its section. In other applications, it may be desirable to provide straight conductors for sustaining anodes extending across the cavities 17 in a single direction and joined at the edge or exterior of the matrix. As a further alternative, the cover plate 12 may be fabricated from an electrical conductive material which would thereby constitute the sustaining anode and would not require a wire mesh as shown in FIG. 1 at 16 or a system of wires as shown in FIG. 2 as 16(*a*), 16(*b*) and 16(*c*).

As a further alternative, the matrix of cells may be provided with cover plates 11 and 12 which are both electrically conductive, and which could then function directly as a sustaining anode and a sustaining cathode. In this case, it would be desirable to add a further insulating layer with the cavities 17 extending therethrough for the purpose of electrical isolation between the cover plate 11 and the conductors 20 and 21. Another alternative would be the addition of a further layer and an extension of the cavities to permit a vertical spacing between the sense cathodes 20 and the starter cathodes 21 which are shown in the drawing to have a horizontal spacing.

The completed matrix as illustrated in FIG. 1 will be a sandwich-like structure with the electrical conductors protruding from the sides or edges. The cavities 17 are evacuated and filled partially with an appropriate gas and then the device is heated to fuse the glass layers. A good air-tight seal is necessary only at the peripheral portions of the device, and it is not necessary that each cavity 17 be isolated from the adjoining cavities by a gas-tight seal. Indeed, if it is possible for the gas molecules to communicate from one cavity 17 to another, then a uniform pressure and gas content is assured in all of the cavities. On the other hand, it has been found that when one such gas cell has been rendered electrically conductive such that gas ions are present therein, these ions will not communicate freely enough with the gases of an adjoining cell to cause conduction in that adjoining cell. Therefore, although there is no gas-tight seal between adjoining cells, the electrical carriers or gas ions which may exist in one cell will not traverse any existing small apertures between cells in sufficient numbers to spread the gaseous conduction to the other cells.

While there have been shown and described and pointed out the fundamental novel features of the invention as applied to the preferred embodiment, it will be understood that various omissions and substitutions and changes in the form and details of the device illustrated and in its operation may be made by those skilled in the art, without departing from the spirit of the invention. It is the intention, therefore, to be limited only as indicated by the scope of the following claims.

What is claimed is:

1. A data storage device comprising a body of electrically insulating material including a plurality of laminations bonded together and having a plurality of gas-filled cavities arranged in rows and columns therein, sense cathode and starter cathode conductors between first and second of said laminations and intersecting said cavities by columns, starter anode conductors between second and third of said laminations and intersecting said cavities by rows, sense anode conductors between third and fourth of said laminations and intersecting said cavities by rows, sustaining anode conductors between fourth and fifth of said laminations and intersecting all of said cavities, means including said starter anodes and starter cathodes for initiating an electrical discharge in one of said cavities, means including said sustaining anodes and said cathode conductors for sustaining an electrical discharge in said cavities, and means including said sense anode and sense cathode for detecting the presence of an electrical discharge in a selected one of said cavities.

2. A data storage device comprising a body of electrically insulating material having a plurality of gas-filled cavities arranged in rows and columns therein, sense cathodes intersecting said cavities in a first plane by columns, starter cathodes intersecting said cavities in a second plane by columns, a sustaining anode intersecting all of said cavities in a third plane, starter anodes intersecting said cavities in a fourth plane by rows, said fourth plane being intermediate both said first and third planes and said second and third planes, sense anodes intersecting said cavities in a fifth plane by rows, said fifth plane being intermediate said third plane and fourth plane.

References Cited in the file of this patent

UNITED STATES PATENTS

| | | |
|---|---|---|
| 2,603,716 | Low | July 15, 1952 |
| 2,624,786 | Potter | Jan. 6, 1953 |
| 2,709,042 | Couffignal | May 24, 1955 |

| | | |
|---|---|---|
| 2,825,046 | Herbert et al. | Feb. 25, 1958 |
| 2,828,447 | Mauchly | Mar. 25, 1958 |
| 2,847,615 | Engelbart | Aug. 12, 1958 |
| 2,872,664 | Minot | Feb. 3, 1959 |
| 2,889,538 | Geisler | June 2, 1959 |
| 2,890,439 | Bird et al. | June 9, 1959 |
| 2,900,572 | Lucas | Aug. 18, 1959 |
| 2,933,648 | Bentley | Apr. 19, 1960 |